United States Patent
Itakura et al.

(10) Patent No.: US 11,104,293 B2
(45) Date of Patent: Aug. 31, 2021

(54) AIRBAG DEVICE

(71) Applicant: NIHON PLAST CO., LTD., Fujinomiya (JP)

(72) Inventors: Toru Itakura, Shizuoka (JP); Kei Sano, Shizuoka (JP)

(73) Assignee: NIHON PLAST CO., LTD., Fujinomiya (JP)

( * ) Notice: Subject to any disclaimer, the term of this patent is extended or adjusted under 35 U.S.C. 154(b) by 197 days.

(21) Appl. No.: 16/270,398

(22) Filed: Feb. 7, 2019

(65) Prior Publication Data

US 2020/0254958 A1    Aug. 13, 2020

(30) Foreign Application Priority Data

Feb. 16, 2018  (JP) .............................. JP2018-025597

(51) Int. Cl.
*B60R 21/237*    (2006.01)

(52) U.S. Cl.
CPC .................................. *B60R 21/237* (2013.01)

(58) Field of Classification Search
CPC ............................ B60R 21/205; B60R 21/237
See application file for complete search history.

(56) References Cited

U.S. PATENT DOCUMENTS

| | | | | |
|---|---|---|---|---|
| 4,842,300 A * | 6/1989 | Ziomek | .................. | B60R 21/205 280/732 |
| 5,178,407 A * | 1/1993 | Kelley | .................. | B60R 21/231 280/728.1 |
| 5,542,698 A * | 8/1996 | Ichino | .................. | B60R 21/231 280/732 |
| 6,196,585 B1 * | 3/2001 | Igawa | .................. | B60R 21/237 280/728.1 |
| 6,241,282 B1 * | 6/2001 | Specht | ............... | B60R 21/2338 280/743.1 |
| 6,244,624 B1 * | 6/2001 | Kumagai | .............. | B60R 21/237 280/732 |
| 6,247,727 B1 * | 6/2001 | Hamada | ............. | B60R 21/2171 280/743.1 |
| 6,390,500 B1 * | 5/2002 | Yamada | ............. | B60R 21/2171 280/732 |
| 6,422,602 B1 * | 7/2002 | Ishii | ....................... | B60Q 5/003 280/728.2 |
| 6,692,024 B2 * | 2/2004 | Fischer | ................ | B60R 21/205 280/732 |
| 6,854,759 B2 * | 2/2005 | Schwark | .............. | B60R 21/231 280/730.1 |

(Continued)

FOREIGN PATENT DOCUMENTS

| | | | |
|---|---|---|---|
| JP | 2000-79862 A | | 3/2000 |
| JP | 2019142258 A | * | 8/2019 |

*Primary Examiner* — Laura Freedman

(74) *Attorney, Agent, or Firm* — Procopio, Cory, Hargreaves & Savitch LLP

(57) ABSTRACT

An airbag device includes an airbag main body formed in a bag shape, and a case body in which the airbag main body folded is stored. The airbag main body includes a first folded part including an opening for gas introduction provided in a base end portion of the first folded part, and multiple second folded parts connected to a distal end portion of the first folded part. The airbag main body folded is stored in the case body such that a connecting part among the first folded part and the second folded parts faces a door part of the case body.

4 Claims, 4 Drawing Sheets

(56) References Cited

U.S. PATENT DOCUMENTS

| | | | | |
|---|---|---|---|---|
| 6,942,245 | B2 * | 9/2005 | Takimoto | B60R 21/206 |
| | | | | 280/730.1 |
| 7,011,336 | B2 * | 3/2006 | Sommer | B60R 21/26 |
| | | | | 280/728.2 |
| 7,040,655 | B2 * | 5/2006 | Igawa | B60R 21/233 |
| | | | | 280/729 |
| 7,370,881 | B2 * | 5/2008 | Takimoto | B60R 21/2165 |
| | | | | 280/730.1 |
| 7,530,597 | B2 * | 5/2009 | Bito | B60R 21/233 |
| | | | | 280/742 |
| 7,793,975 | B2 * | 9/2010 | Fukawatase | B60R 21/237 |
| | | | | 280/743.1 |
| 8,517,417 | B2 * | 8/2013 | Fujita | B60R 21/237 |
| | | | | 280/732 |
| 8,540,277 | B2 * | 9/2013 | Miyata | B60R 21/239 |
| | | | | 280/739 |
| 8,608,200 | B2 * | 12/2013 | Miyata | B60R 21/239 |
| | | | | 280/743.1 |
| 9,333,932 | B2 * | 5/2016 | Sakai | B60R 21/205 |
| 9,821,750 | B2 * | 11/2017 | Miura | B60R 21/237 |

* cited by examiner

AIRBAG DEVICE

CROSS-REFERENCE TO RELATED APPLICATION

This application claims the benefit of priority of Japanese Patent Application No. 2018-025597, filed on Feb. 16, 2018, the entire contents of which are hereby incorporated by reference.

BACKGROUND OF THE INVENTION

1. Field of the Invention

The present invention relates to an airbag device.

2. Description of the Related Art

An airbag device has been publicly known which protects an occupant from impact from a collision of a vehicle such as an automobile (for example, Japanese Patent Application Publication No. 2000-79862).

The airbag device includes, for example, an airbag main body formed in a bag shape, and a case body in which the airbag main body is stored. In the airbag device like this, the airbag main body is folded and stored in the case body.

SUMMARY OF THE INVENTION

There are many methods of folding an airbag main body, because the methods have influence on various performances such as an occupant restraint performance. Particularly, for storage in the case body, the airbag main body is required to be folded in such a way that the airbag main body can be deployed more smoothly during inflation of the airbag main body.

In view of this, an object of the present invention is to provide an airbag device capable of more smoothly deploying an airbag main body during inflation of the airbag main body.

An airbag device according to the present invention includes an airbag main body formed in a bag shape, and a case body in which the airbag main body folded is stored. The airbag main body includes a first folded part including an opening for gas introduction in a base end portion of the first folded part, and multiple second folded parts connected to a distal end portion of the first folded part. The airbag main body folded is stored in the case body such that a connecting part among the first folded part and the second folded parts faces a door part of the case body.

The airbag device according to the present invention is capable of more smoothly deploying an airbag main body during inflation of the airbag main body.

DESCRIPTION OF THE PREFERRED EMBODIMENT

Figure 1:
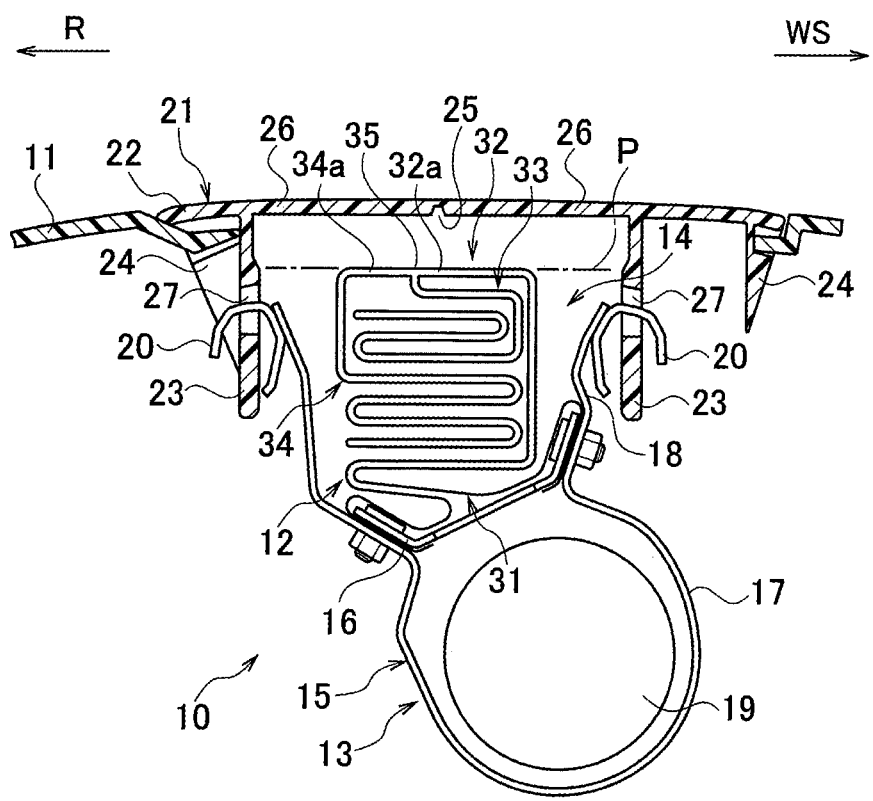
FIG. 1 is a vertical cross-sectional view of an airbag device according to an embodiment of the present invention.

Referring to the drawings, detailed descriptions will be hereinbelow provided for an embodiment of the present invention The embodiment shows an example of an airbag device for an occupant seated in a passenger seat in a vehicle which is arranged inside an instrument panel or the like in front of the passenger seat.

Figure 2:
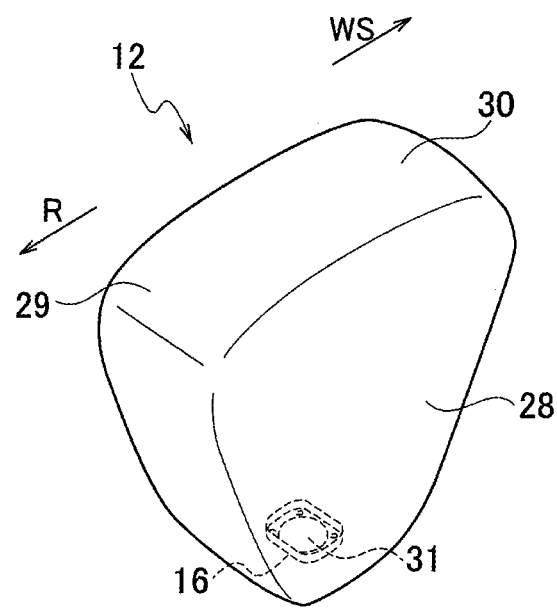
FIG. 2 is a schematic perspective view illustrating an airbag main body inflated and deployed.

As illustrated in FIGS. 1 and 2, an airbag device 10 is arranged inside an instrument panel 11 located in front of a passenger seat in a vehicle, and serves as an airbag device for an occupant seated in the passenger seat. In FIGS. 1 and 2, an arrow WS represents a direction toward a windshield (that is to say, a direction toward a vehicle front), while an arrow R represents a direction toward the occupant (that is to say, a direction toward a vehicle rear).

The airbag device 10 includes an airbag main body 12 formed in a bag shape, and a case body 13 in which the airbag main body 12 folded is stored.

The case body 13 includes a case body main body 15 having an upper open section 14, and forms in a box shape. The interior of the case body main body 15 is divided by a retainer 16, serving as a partition member as well, into upper and lower sections. Specifically, an inflator storage section 17 located under the retainer 16, and an airbag storage section 18 located above the retainer 16 are defined and formed in the interior of the case body main body 15. The inflator storage section 17 stores an inflator 19 for injecting gas, while the airbag storage section 18 stores the folded airbag main body 12. Multiple cover attachment claws 20, shaped substantially like the letter C in their side view, are fixed to an outer surface of an upper portion of the case body main body 15. The upper open section 14 of the case body main body 15 is covered with, and closed by, a cover body 21. The case body main body 15 of the case body 13, the retainer 16, and the cover attachment claws 20 are made, for example, from metal material.

The cover body 21 is also referred to as a lid, and is made, for example, from synthetic resin material. The cover body 21 includes a panel part 22 substantially flush with the instrument panel 11, a pair of leg piece parts 23 projectively provided to a back surface of the panel part 22, and claw parts 24 arranged outward of the leg piece parts 23. A break part (tear line) 25 is formed in the back surface of the panel part 22. The break part (tear line) 25 is thinner than the other portion of the panel part 22, and is accordingly easier to break than the other part of the panel part 22. Door parts (door-scheduled parts) 26 are formed in the cover part 21 by being defined by the break part 25. Each leg piece part 23 includes a lock hole 27 formed therein, in which to lock a corresponding one of the cover attachment claws 20 of the case body 13.

The airbag main body 12 is simply referred to as airbag as well. A single or multiple pieces of base cloth are sewn into the airbag main body 12 in a bag shape. The airbag main body 12 includes a first deployment part 28 serving as a gas introduction part, a second deployment part 29 on the occupant side R formed continuing toward the occupant side R (downward) from the first deployment part 28, and a second deployment part 30 on the windshield side WS formed continuing toward the windshield side WS (upward) from the first deployment part 28 (see FIG. 2).

The airbag main body 12 folded in a predetermined folded form is stored in the case body 13 (see FIG. 1). The airbag main body 12 in the folded state includes a first folded part 32 including an opening 31 for gas introduction provided in a base end portion of the first folded part 32, and multiple (two, in the embodiment) second folded parts 33, 34 connected to a distal end portion of the first folded part 32. In the airbag main body 12 in the folded state stored in the case body 13, a connecting part 35 among the first folded part 32 and the second folded parts 33, 34 faces the door parts 26 of the case body 13. Of the two second folded parts 33, 34, the second folded part 34 includes an end part 34a on the side of the connecting part 35 which is flush with an end part 32a of the first folded part 32 on the side of the connecting part 35 on the same plane P (a plane parallel with the surfaces of the door parts 26 of the case body 13).

The first folded part 32 is a part corresponding to the first deployment part 28 (see FIG. 2). In the illustrated example of the embodiment, the first folded part 32 is folded in an alligator-mouth-like shape in which the two second folded parts 33, 34 are stacked vertically. The folded form of the first folded part 32 is not limited to the alligator-mouth-like shape shown in FIG. 1, and may be folded in a different folded shape.

Of the two second folded parts 33, 34, the second folded part 33 on the occupant side R is a part corresponding to the second deployment part 29 on the occupant side R (see FIG. 2). In the illustrated example of the embodiment, the second folded part 33 on the occupant side R is folded in a double parallel shape. The folded form of the second folded part 33 on the occupant side R is not limited to the double parallel shape, and may be folded in a different folded shape such as a roll shape or an accordion fold shape.

Of the two second folded parts 33, 34, the second folded part 34 on the windshield side WS is a part corresponding to the second deployment part 30 on the windshield side WS (see FIG. 2). In the illustrated example of the embodiment, the second folded part 34 on the windshield side WS is folded in an accordion fold shape. The folded form of the second folded part 34 on the windshield side WS is not limited to the accordion fold shape, and may be folded in a different folded form such as a roll shape or a double parallel shape.

In the event of a collision or the like of the vehicle, a controller (not illustrated) activates the inflator 19 to introduce gas into the airbag main body 12 from the inflator 19. Thereby, in response to the gas introduction, the airbag main body 12 is inflated and deployed, and breaks the break part (tear line) 25 in the cover body 21, thus projecting outward from the opening of the cover body 21.

Next, based on FIGS. 3 to 7, descriptions will be provided for an example of a step of folding the airbag main body 12.

Figure 3:
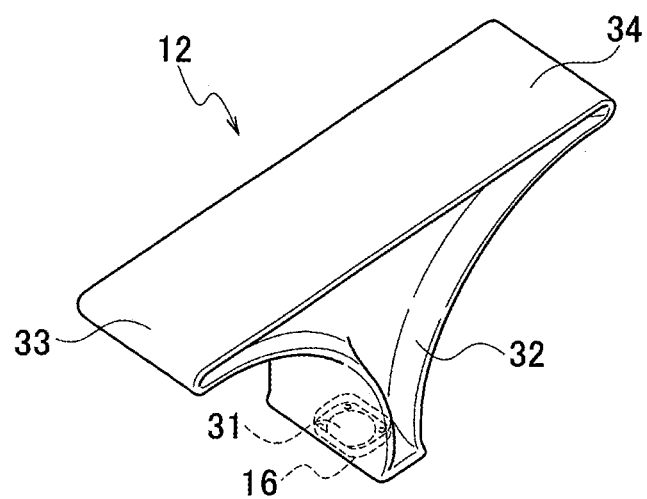
FIG. 3 is an explanatory diagram illustrating an example of a step of folding the airbag main body.
Figure 4:
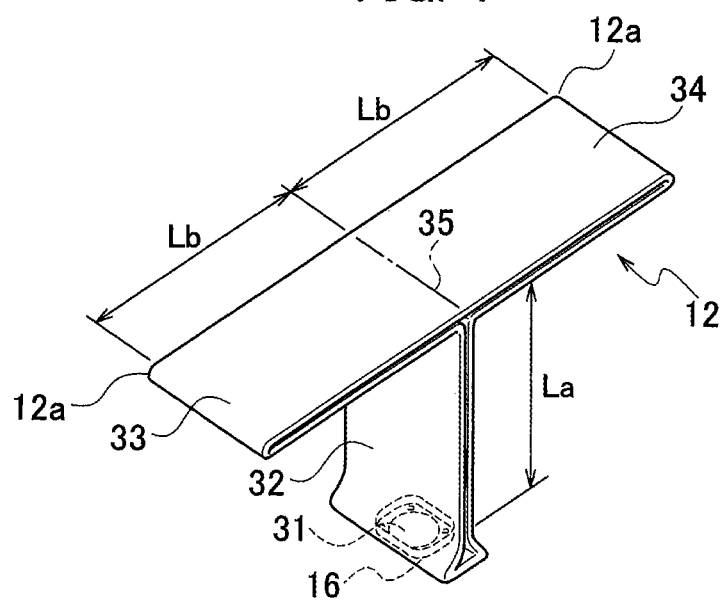
FIG. 4 is an explanatory diagram illustrating an example of a step of folding the airbag main body.

To begin with, as illustrated in FIGS. 3 and 4, the airbag main body 12 is folded substantially into a T shape in its side view. By folding side portions of the airbag main body 12 toward a central portion substantially into the T shape in the side view, the first folded part 32, the two second folded parts 33, 34, and the connecting part 35 among the first folded part 32 and the second folded parts 33, 34 are formed in the airbag main body 12. In this event, the airbag main body 12 is folded such that a length La of the first folded part 32 from the opening 31 to the connecting part 35 is shorter than lengths Lb of the second folded parts 33, 34 from the connecting part 35 to terminal ends 12a of the airbag main body 12 (see FIG. 4).

Figure 5:
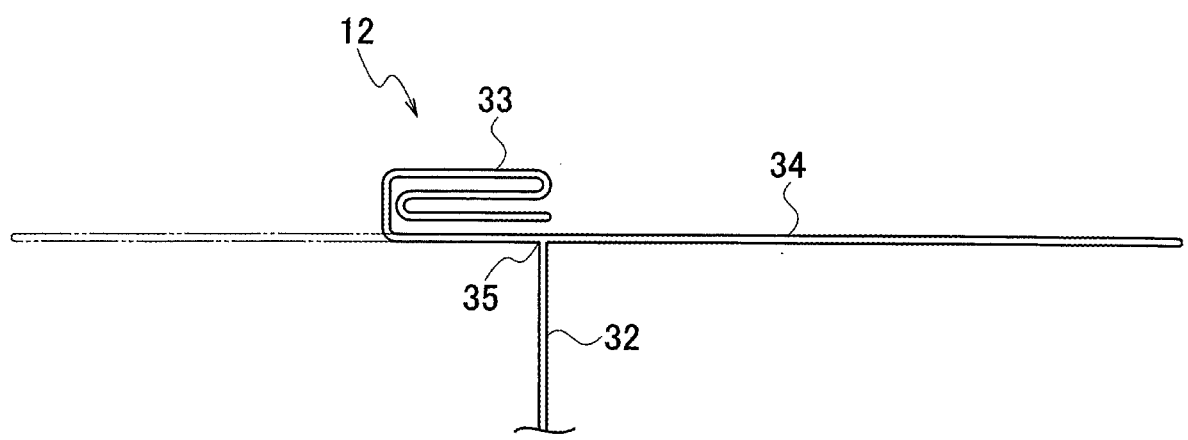
FIG. 5 is an explanatory diagram illustrating an example of a step of folding the airbag main body.

Subsequently, as illustrated in FIG. 5, the second folded part 33 on the occupant side R is folded in a double parallel shape. The second folded part 33 on the occupant side R may be folded in a different folded form such as a roll shape or an accordion fold shape, as discussed above.

Figure 6:
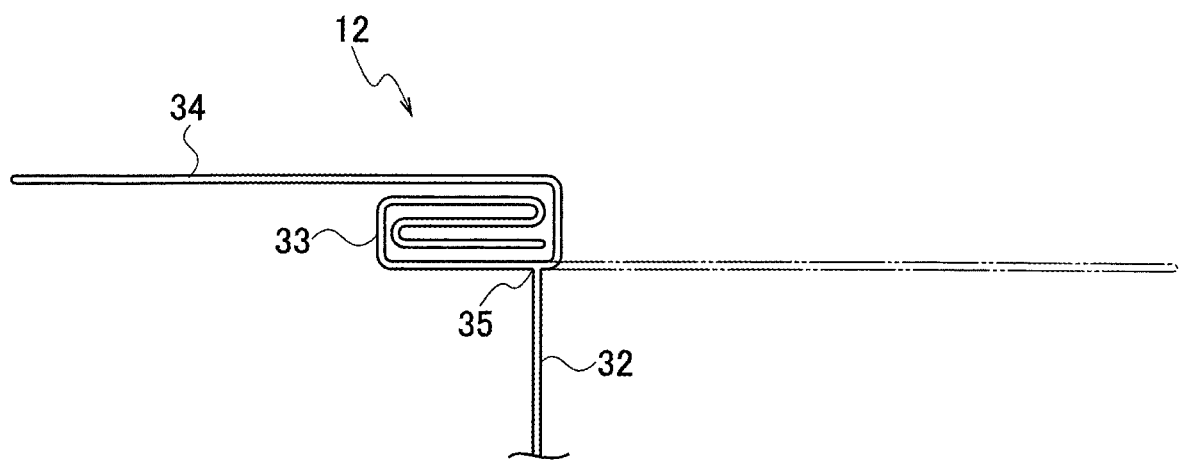
FIG. 6 is an explanatory diagram illustrating an example of a step of folding the airbag main body.
Figure 7:
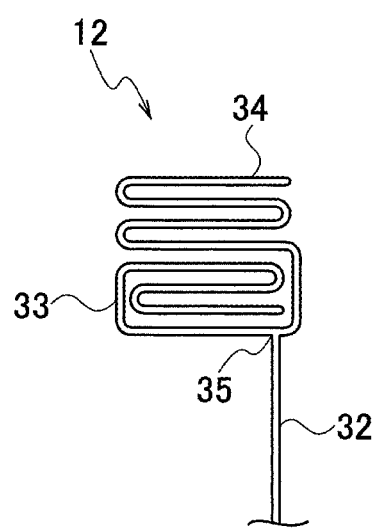
FIG. 7 is an explanatory diagram illustrating an example of a step of folding the airbag main body.

Next, as illustrated in FIG. 6, a portion of the second folded part 34 on the windshield side WS is folded in a way that makes the folded portion vertically hold the second folded part 33 on the occupant side R therein. Furthermore, as illustrated in FIG. 7, the rest of the second folded part 34 on the windshield side WS is folded in an accordion fold shape. The rest of the second folded part 34 on the windshield side WS may be folded in a different folded form such as a roll shape or a double parallel shape.

After that, the first folded part 32 is folded in an alligator-mouth-like shape in which the two second folded parts 33, 34 are stacked vertically (see FIG. 1).

Descriptions will be provided for how the embodiment works and what effects the embodiment brings about.

(1) The airbag device 10 according to the embodiment includes the airbag main body 12 formed in a bag shape, and the case body 13 in which the airbag main body 12 folded is stored. The airbag main body 12 includes the first folded part 32 including the opening 31 for gas introduction in the base end portion, and the multiple second folded parts 33, 34 connected to the distal end portion of the first folded part 32. In the airbag main body 12, as in a folded state, stored in the case body 13, the connecting part 35 among the first folded part 32 and the second folded parts 33, 34 faces the door parts 26 of the case body 13.

The airbag device 10 according to the present invention shortens the distance from the inflator 19 arranged in the opening 31 for gas introduction to the connecting part 35 where the first folded part 32 and the second folded parts 33, 34 are connected together, and is accordingly capable of deploying the airbag main body 12 more smoothly.

(2) The airbag main body 12 is folded such that the length La of the first folded part 32 from the opening 31 to the connecting part 35 is shorter than the lengths Lb of the second folded parts 33, 34 from the connecting part 35 to the terminal ends 12a of the airbag main body 12 (see FIG. 4).

This makes it possible to shorten the distance from the inflator 19 arranged in the opening 31 for gas introduction to the connecting part 35 where the first folded part 32 and the second folded parts 33, 34 are connected together, and accordingly to deploy the airbag main body 12 more smoothly.

(3) The airbag main body 12 includes the at least two of the second folded parts, and in the second folded part 34 which is one of the at least two second folded parts 33, 34, the end part 34a on the side of the connecting part 35 is flush with the end part 32a of the first folded part 32 on the side of the connecting part 35 on the plane P.

Since the airbag main body 12, as in the folded state, stored in the case body 13 has the structure like this, the end part 34a, on the side connecting part 35, of the second folded part 34 which is one of the at least two second folded parts 33, 34 works as if the end part 34a were a portion of the first folded part 32. This makes the two second folded parts 33, 34 work as if the second folded parts 33, 34 were not connected together in the same connecting part, and accordingly makes it possible to reduce load on the connecting part 35 where the first folded part 32 and the second folded parts 33, 34 are connected together.

Although the airbag device according to the present invention has been explained using the above-discussed embodiment, the airbag device is not limited to that according to the embodiment. Various different embodiments may be employed within a scope not departing from the gist or spirit of the present invention.

For example, if the first folded part 32 can be made shorter, the connecting part 35 among the first folded part 32 and the second folded parts 33, 34 may face the leg piece part 23 on the windshield side WS, instead of the door parts 26 of the case body 13, to locate the end part 34a of the second folded part 34 on the side of the connecting part 35 flush with the end part 32a of the first folded part 32 on the side of the connecting part 35 on the same plane (the plane parallel with the surface of the leg piece part 23 on the windshield side WS).

Although the above-discussed embodiment has shown the example of the airbag device for an occupant seated in a passenger seat in a vehicle to be arranged inside the instrument panel or the like in front of the passage seat, the present invention is not limited to this embodiment, and is applicable to an airbag device for an occupant seated in a driver's seat to be arranged inside a steering wheel in a vehicle.

What is claimed is:

1. An airbag device comprising:
an airbag main body formed in a bag shape; and
a case body in which the airbag main body is stored in a folded configuration, wherein
the airbag main body includes
a first folded part including an opening for gas introduction provided in a base end portion of the first folded part, and
a plurality of second folded parts connected to a distal end portion of the first folded part,
the airbag main body is stored in the folded configuration in the case body such that a connecting part among the first folded part and the second folded parts faces a door part of the case body, and
the first folded part is folded in an alligator-mouth shape in which the plurality of the second folded parts are stacked vertically.

2. The airbag device according to claim 1, wherein wheni the airbag main body is in the folded configuration, a first length of the first folded part, the first length being from the opening to the connecting part, is shorter than a second length of each second folded part in the plurality of the second folded parts, the second length being from the connecting part to a terminal end of the airbag main body.

3. The airbag device according to claim 1, wherein
in one of the plurality of the second folded parts, an end portion on a side of the connecting part is on the same plane with an end portion of the first folded part on the side of the connecting part.

4. The airbag device according to claim 3, wherein the same plane is parallel with a surface of the door part of the case body.

* * * * *